United States Patent
Kitajima et al.

(10) Patent No.: US 8,407,150 B2
(45) Date of Patent: Mar. 26, 2013

(54) RELIABILITY EVALUATION DEVICE, RELIABILITY EVALUATION METHOD, AND COMPUTER PROGRAM PRODUCT

(75) Inventors: Hironobu Kitajima, Kawasaki (JP); Ryo Ochitani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1774 days.

(21) Appl. No.: 11/653,250

(22) Filed: Jan. 16, 2007

(65) Prior Publication Data

US 2007/0283206 A1   Dec. 6, 2007

(30) Foreign Application Priority Data

May 15, 2006 (JP) ................................. 2006-135618

(51) Int. Cl.
  *G06Q 99/00* (2006.01)
(52) U.S. Cl. .......................................... 705/325; 706/52
(58) Field of Classification Search .................. 705/325; 706/52
  See application file for complete search history.

(56) References Cited

U.S. PATENT DOCUMENTS

| | | | |
|---|---|---|---|
| 7,315,947 B2 * | 1/2008 | Pravetz et al. ................ | 713/176 |
| 2002/0046072 A1 * | 4/2002 | Arai et al. .......................... | 705/8 |
| 2004/0133457 A1 * | 7/2004 | Sadiq et al. ....................... | 705/7 |
| 2004/0133876 A1 * | 7/2004 | Sproule ........................... | 717/105 |
| 2006/0026003 A1 * | 2/2006 | Carus et al. ..................... | 704/275 |
| 2006/0136721 A1 * | 6/2006 | Bruestle et al. ................ | 713/168 |
| 2006/0184483 A1 * | 8/2006 | Clark et al. ...................... | 706/45 |
| 2006/0265221 A1 * | 11/2006 | Howes .......................... | 704/235 |
| 2007/0179924 A1 * | 8/2007 | Zhong et al. .................... | 706/55 |
| 2009/0327317 A1 * | 12/2009 | Ulmer et al. ................... | 707/100 |

FOREIGN PATENT DOCUMENTS

| | | |
|---|---|---|
| EP | 1 185 027 A2 | 3/2002 |
| JP | 3588042 | 8/2004 |
| WO | 01/22651 A2 | 3/2001 |

OTHER PUBLICATIONS

Lyu M R et al., "CASRE: a computer-aided software reliability estimation tool", Computer-Aided Software Engineering, 1992, Proceedings, Fifth International Workshop in Montreal, Que, Canada Jul. 6-10, 1992, pp. 264-275.
European Search Report dated Jun. 7, 2010 and issued in corresponding European Patent Application 07100457.6.

* cited by examiner

*Primary Examiner* — Traci Casler
(74) *Attorney, Agent, or Firm* — Staas & Halsey LLP

(57) ABSTRACT

A reliability evaluation device includes a route acquiring unit that acquires a route from a starting point to a verification point of an application procedure as a group of paths indicative of relation between objects used for identity verification at each step based on data that includes the paths, a direction in which information is transferred, and path reliabilities indicative of accuracy of transferring the information, and a verification-point-reliability computing unit that computes reliability of the application procedure at the verification point by multiplying the path reliabilities by the reliability at the starting point.

9 Claims, 14 Drawing Sheets

FIG.1

| | | OLD LICENSE@ RECEPTIONIST | | | APPLICATION FORM@ RECEPTIONIST | | | APPLICANT@ RECEPTIONIST | APPLICATION FORM@ EXAMINER | | | ... |
|---|---|---|---|---|---|---|---|---|---|---|---|---|
| | | PHOTO | NAME | ADDRESS | PHOTO | NAME | ADDRESS | FIGURE | PHOTO | NAME | ADDRESS | ... |
| OLD LICENSE@ RECEPTIONIST | PHOTO | – | | | | | | | | | | ... |
| | NAME | | ... | | | | | | | | | ... |
| | ADDRESS | COMPARE | | | | | | | | | | ... |
| APPLICATION FORM@ RECEPTIONIST | PHOTO | COMPARE | | | – | | | | | | | ... |
| | NAME | | COMPARE | | | | | | | | | ... |
| | ADDRESS | | | COMPARE | | | – | | | | | ... |
| APPLICANT@ RECEPTIONIST | FIGURE | COMPARE | | | | | | | BRING | | | ... |
| APPLICATION FORM@ EXAMINER | PHOTO | | | | | | BRING | | | | | ... |
| | NAME | | | | | BRING | | | | – | | ... |
| | ADDRESS | | | | | | BRING | | | | – | ... |
| APPLICANT@ EXAMINER | FIGURE | | | | | | | MOVE | COMPARE | | | ... |
| ... | | ... | ... | ... | ... | ... | ... | ... | ... | ... | ... | ... |

FIG. 2

| | PHOTO | PHOTO | FIGURE | PHOTO | FIGURE | PHOTO | FIGURE | PHOTO | PHOTO | PHOTO | PHOTO | FIGURE |
|---|---|---|---|---|---|---|---|---|---|---|---|---|
| | OLD LICENSE@ RECEPTIONIST | APPLICATION FORM@ RECEPTIONIST | APPLICANT@ RECEPTIONIST | APPLICATION FORM@ EXAMINER | APPLICANT@ EXAMINER | APPLICATION FORM@ PHOTOGRAPHER | APPLICANT@ PHOTOGRAPHER | LICENSE PHOTO@ PHOTOGRAPHER | APPLICATION FORM@ CREATOR | NEW LICENSE@ CREATOR | NEW LICENSE@ ISSUER | APPLICANT@ ISSUER |
| OLD LICENSE@ RECEPTIONIST PHOTO | - | COMPARE 1.0 | COMPARE 1.0 | | | | | | | | | |
| APPLICATION FORM@ RECEPTIONIST PHOTO | | - | | BRING 0.8 | | | | | | | | |
| APPLICANT@ RECEPTIONIST FIGURE | | | - | | MOVE 0.0 | | | | | | | |
| APPLICATION FORM@ EXAMINER PHOTO | | | | - | | BRING 0.9 | MOVE COMPARE 0.0 1.0 | | | | | |
| APPLICANT@ EXAMINER FIGURE | | | | | - | | MOVE 0.0 | | | | | |
| APPLICATION FORM@ PHOTOGRAPHER PHOTO | | | | | | - | | | TRANSFER 1.0 | | | |
| APPLICANT@ PHOTOGRAPHER FIGURE | | | | | | | - | PHOTOGRAPH 1.0 | | | MOVE 0.0 | |
| LICENSE PHOTO@ PHOTOGRAPHER PHOTO | | | | | | | | - | | | TRANSCRIPT 1.0 | |
| APPLICATION FORM@ CREATOR PHOTO | | | | | | | | | - | | | |
| NEW LICENSE@ CREATOR PHOTO | | | | | | | | | | - | TRANSFER 1.0 | |
| NEW LICENSE@ ISSUER PHOTO | | | | | | | | | | | - | COMPARE 1.0 |
| APPLICANT@ ISSUER FIGURE | | | | | | | | | | | | - |

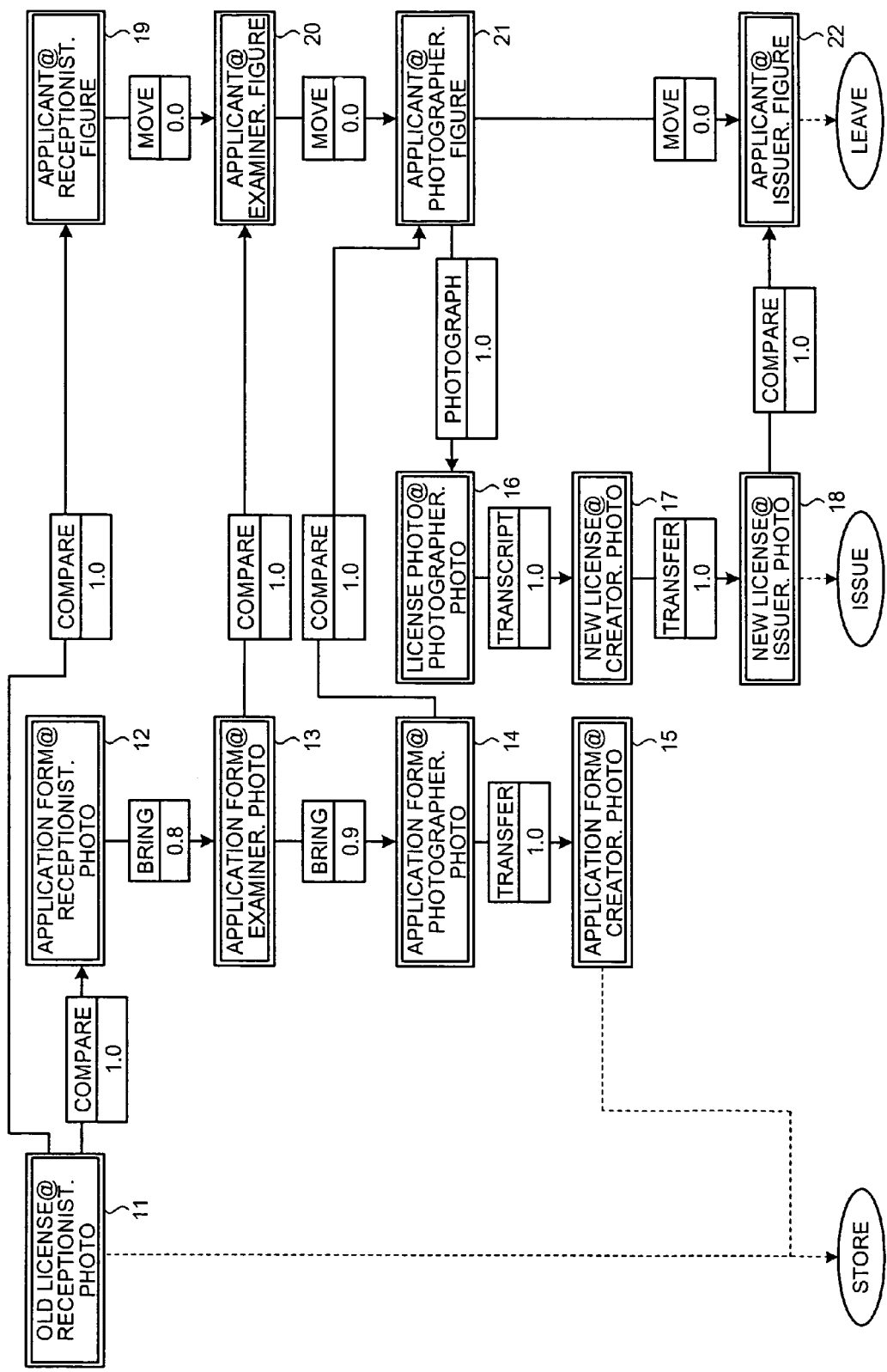

FIG.6

| OBJECT ID | OBJECT NAME |
|---|---|
| OB001 | OLD LICENSE |
| OB002 | APPLICATION FORM |
| OB003 | APPLICANT |
| OB004 | LICENSE PHOTO |
| OB005 | NEW LICENSE |

FIG.7

| ATTRIBUTE ID | ATTRIBUTE NAME | RELATED ATTRIBUTE |
|---|---|---|
| AT001 | PHOTO | AT004 |
| AT002 | NAME | - |
| AT003 | ADDRESS | - |
| AT004 | FIGURE | AT001 |
| ... | ... | ... |

FIG.8

| OBJECT ID | ATTRIBUTE ID | REMARKS |
|---|---|---|
| OB001 | AT001 | OLD LICENSE. PHOTO |
| OB002 | AT001 | APPLICATION FORM. PHOTO |
| OB003 | AT004 | APPLICANT. FIGURE |
| ... | ... | ... |

FIG.9

| NODE NAME | OBJECT ID | OCCURRENCE ORDER |
|---|---|---|
| OLD LICENSE@RECEPTIONIST | OB001 | 1 |
| APPLICATION FORM@RECEPTIONIST | OB002 | 1 |
| APPLICANT@RECEPTIONIST | OB003 | 1 |
| APPLICATION FORM@EXAMINER | OB002 | 2 |
| APPLICANT@EXAMINER | OB003 | 2 |
| ... | ... | ... |

FIG.10

| ORIGIN | | DESTINATION | | ACTION | PATH RELIABILITY | VERIFICATION-POINT FLAG | VERIFICATION-POINT RELIABILITY |
|---|---|---|---|---|---|---|---|
| NODE NAME | ATTRIBUTE ID | NODE NAME | ATTRIBUTE ID | | | | |
| – | – | OLD LICENSE@ RECEPTIONIST | AT001 | – | 1.00 | – | – |
| OLD LICENSE@ RECEPTIONIST | AT001 | APPLICATION FORM@ RECEPTIONIST | AT001 | COMPARE | 1.00 | 1 | |
| OLD LICENSE@ RECEPTIONIST | AT001 | APPLICANT@ RECEPTIONIST | AT004 | COMPARE | 1.00 | 0 | |
| APPLICATION FORM@ RECEPTIONIST | AT001 | APPLICATION FORM@ EXAMINER | AT001 | BRING | 0.80 | 1 | |
| APPLICANT@ RECEPTIONIST | AT004 | APPLICANT@ EXAMINER | AT004 | MOVE | 0.00 | 0 | |
| ⋮ | ⋮ | ⋮ | ⋮ | ⋮ | ⋮ | ⋮ | ⋮ |

FIG.11

| | STARTING POINT RELIABILITY | PHOTO / OLD LICENSE@ RECEPTIONIST | PHOTO / APPLICATION FORM@ RECEPTIONIST | FIGURE / APPLICANT@ RECEPTIONIST | PHOTO / APPLICATION FORM@ EXAMINER | FIGURE / APPLICANT@ EXAMINER | PHOTO / APPLICATION FORM@ PHOTOGRAPHER | FIGURE / APPLICANT@ PHOTOGRAPHER | PHOTO / LICENSE PHOTO@ PHOTOGRAPHER | PHOTO / APPLICATION FORM@ CREATOR | PHOTO / NEW LICENSE@ CREATOR | PHOTO / NEW LICENSE@ ISSUER | FIGURE / APPLICANT@ ISSUER |
|---|---|---|---|---|---|---|---|---|---|---|---|---|---|
| VERIFICATION RELIABILITY | | 1 | 1 | 1 | | | 1 | | | | 1 | | |
| PHOTO / OLD LICENSE@RECEPTIONIST | | – | COMPARE 1.0 | COMPARE 1.0 | | | | | | | | | |
| PHOTO / APPLICATION FORM@RECEPTIONIST | | | – | BRING 0.8 | | | | | | | | | |
| FIGURE / APPLICANT@RECEPTIONIST | | | | – | MOVE 0.0 | | | | | | | | |
| PHOTO / APPLICATION FORM@EXAMINER | | | | | – | MOVE COMPARE 1.0 | BRING 0.9 | | | | | | |
| FIGURE / APPLICANT@EXAMINER | | | | | | – | | MOVE COMPARE 0.0 | | | | | |
| PHOTO / APPLICATION FORM@PHOTOGRAPHER | | | | | | | – | MOVE COMPARE 1.0 | | TRANSFER 1.0 | | | |
| FIGURE / APPLICANT@PHOTOGRAPHER | | | | | | | | – | | PHOTOGRAPH 1.0 | | MOVE 0.0 | |
| PHOTO / LICENSE PHOTO@PHOTOGRAPHER | | | | | | | | | – | | | TRANSCRIPT 1.0 | |
| PHOTO / APPLICATION FORM@CREATOR | | | | | | | | | | – | | | |
| PHOTO / NEW LICENSE@CREATOR | | | | | | | | | | | – | TRANSFER 1.0 | |
| PHOTO / NEW LICENSE@ISSUER | | | | | | | | | | | | – | COMPARE 1.0 |
| FIGURE / APPLICANT@ISSUER | | | | | | | | | | | | | – | ved
RELIABILITY EVALUATION DEVICE, RELIABILITY EVALUATION METHOD, AND COMPUTER PROGRAM PRODUCT

BACKGROUND OF THE INVENTION

1. Field of the Invention

The present invention relates to a technology for quantitatively evaluating reliability of an application procedure.

2. Description of the Related Art

In general, an application procedure that requires high reliability is processed after verifying identity of the applicant from an application form, a certificate, and the like submitted by the applicant. Thus, the certificate is highly significant for the identity verification, and an advanced anticounterfeit technology such as an electronic signature disclosed in Japanese Patent No. 3588042 is used for certificates to improve the reliability thereof.

However, no matter how advanced anticounterfeit technology is used for the certificate, when the application procedure is complicated and involves many personnel, the procedure can be vulnerable to a wrong such as an identity theft (the applicant masquerading as another person), a human error can occur, and it is difficult to keep the application procedure reliable.

For this reason, there has been a demand for a technology of quantitatively evaluating the reliability of the application procedure, finding a problem, and supporting development of an improvement plan in a process of designing the application procedure and the like. Although a method of analyzing a process in view of efficiency and cost reduction has been known, there has not been a method of analyzing it in view of the reliability.

SUMMARY OF THE INVENTION

It is an object of the present invention to at least partially solve the problems in the conventional technology.

According to an aspect of the present invention, a computer-readable recording medium stores therein a computer program that causes a computer to evaluate reliability of an application process, the program causing a computer to execute acquiring a route from a starting point to a predetermined step in the application procedure as a group of paths indicative of relation between objects used for identity verification of an applicant at each step of the application procedure based on data stored with a direction of information related to the identity verification being transferred in the paths and a path reliability indicative of accuracy of the information; and computing a reliability of the application procedure at the predetermined step by multiplying the path reliability corresponding to each of the paths that form the route acquired at the acquiring by the reliability at the starting point.

According to another aspect of the present invention, a reliability evaluation device includes a route acquiring unit that acquires a route from a starting point to a predetermined step in the application procedure as a group of paths indicative of relation between objects used for identity verification of an applicant at each step of the application procedure based on data stored with a direction of information related to the identity verification being transferred in the paths and a path reliability indicative of accuracy of the information; and a reliability computing unit that computes a reliability of the application procedure at the predetermined step by multiplying the path reliability corresponding to each of the paths that form the route acquired by the route acquiring unit by the reliability at the starting point.

According to still another aspect of the present invention, a method of evaluating reliability of an application process includes acquiring a route from a starting point to a predetermined step in the application procedure as a group of paths indicative of relation between objects used for identity verification of an applicant at each step of the application procedure based on data stored with a direction of information related to the identity verification being transferred in the paths and a path reliability indicative of accuracy of the information; and computing a reliability of the application procedure at the predetermined step by multiplying the path reliability corresponding to each of the paths that form the route acquired at the acquiring by the reliability at the starting point.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is an example of an action matrix indicative of a verification process in an application procedure of a license renewal;

FIG. 2 is an example of an action matrix focusing on photos and a figure;

FIG. 3 is a block diagram based on the action matrix shown in FIG. 2;

FIG. 6 is an example of a data configuration of object information;

FIG. 7 is an example of a data configuration of attribute information;

FIG. 8 is an example of a data configuration of object-attribute information;

FIG. 9 is an example of a data configuration of node information;

FIG. 10 is an example of a data configuration of path information;

FIG. 11 is an example of input/output interface for the path information;

DETAILED DESCRIPTION OF THE PREFERRED EMBODIMENTS

Figure 4:
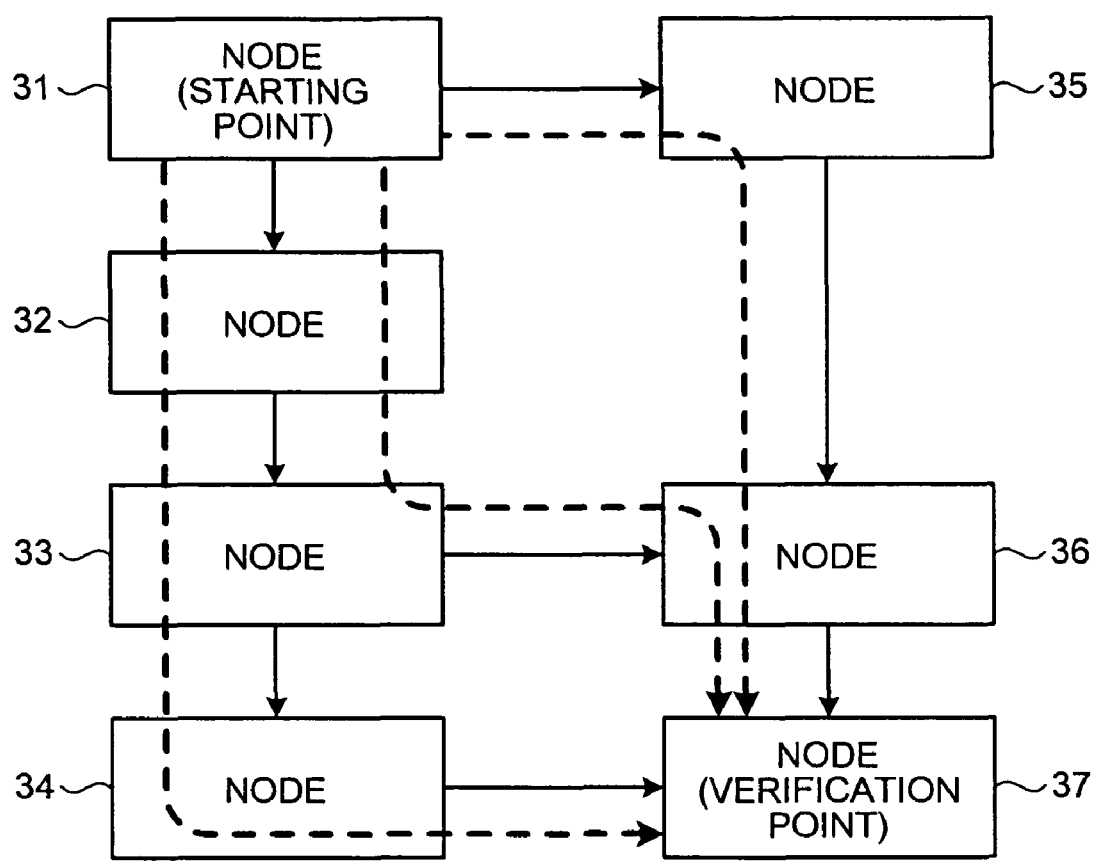
FIG. 4 is a schematic for outlining a reliability evaluation method according to an embodiment.

Exemplary embodiments of a reliability evaluation device and a computer program product according to the present invention are explained below in detail referring to the accompanying drawings. While the reliability evaluation device and the computer program product are applied to a procedure of renewing a driver's license (hereinafter, "license") according to the following embodiment, the present invention is not limited to the embodiments explained below.

The license renewal procedure is a procedure to replace a license that has passed a validity period (hereinafter, "old license") with a license having a new validity period (hereinafter, "new license").

In the license renewal procedure, an applicant submits an application form that includes a name, an address, and a photograph (hereinafter, "photo") of the applicant to a person at a reception desk (hereinafter, "receptionist") and the identity is thereby verified. The receptionist compares the photo on the old license with the figure (face) of the applicant, and verifies that the applicant is a legitimate owner of the old license. The receptionist then compares the photo and the description on the old license with those on the application form, and verifies that the photo on the application form is that of the applicant and that the description is correct.

The applicant proceeds with necessary processes by bringing the application form, and receives the new license at last. A person in an applied party in charge of each process compares the photo on the application form with the figure of the applicant, and verifies the legitimateness of the applicant. In this manner, in the license renewal procedure, personal identification is performed at each step using the application form as an identification certificate.

To evaluate reliability of the application procedure, it is required to track the relations between the identification certificates and the applicant (hereinafter, "objects") compared in the verification at each step based on the procedure described above, and systematically determine the legitimateness of the relations. The reliability evaluation method according to an embodiment of the present invention includes arrangement of the comparison relation in the form of a matrix data. The matrix is herein referred to as an action matrix.

FIG. 1 is an example of the action matrix. The objects used for the verification at the steps of the procedure are arranged in a top row and a leftmost column of the action matrix. In the action matrix, identical objects are distinguished by the step at which the object is used.

To distinguish the object by the step of the application procedure, an object used at a predetermined step is described herein as <object name>@<person in the applied party in charge of the predetermined step>.

For example, an "application form@receptionist" and an "application form@examiner" are regarded as different items though they actually refer to the same item. The examiner is a person in the applied party in charge of examining visual acuity and the like of the applicant.

Attributes such as the photo, the name, the address, and the figure included in the objects are also arranged in the top row and the leftmost column of the action matrix as elements of each object. The object including the attribute at the predetermined step is described herein as <object name>@<person in the applied party in charge of the predetermined step>.<attribute name>.

At an intersection of a column and a row of the attributes in the top row and the leftmost column, an action indicative of the comparison relation between the attributes is set. For example, an action "move" indicates a move of the attribute accompanying the move of the applicant. An action "transfer" indicates a delivery of the attribute by the person in the applied party, and an action "bring" indicates the delivery of the attribute by the applicant.

An action "compare" indicates comparison by the person in the applied party to check identity of objects, an action "photograph" indicates taking a picture of the applicant by the person in the applied party, and an action "transcript" indicates transcription of the attribute to another document by the person in the applied party.

Each action is directional, and is set in the action matrix so that information flows from the attribute in the top row to the attribute in the leftmost column. The "compare" is generally regarded as bidirectional; however, the "compare" is regarded as a directional action in which the object that the person in the applied party trusts more is regarded as an original and the other object is regarded as a target of the comparison. In other words, the person that performs the comparison copies reliability of the original of the comparison to the target of the comparison by performing the comparison.

The attribute in the leftmost column associated with that in the top row via the action appears in the next step as the attribute with the same name in the top row, which is again associated with another attribute in the leftmost column via an action. Repetition of the association between the attributes until the end of the application procedure is serially represented in the action matrix.

The action matrix shown in FIG. 1 indicates that the photo on the old license is compared with the figure of the applicant by the receptionist and that the figure, which is the target of the comparison, moves to the examiner along with the move of the applicant.

The action matrix further indicates that the photo, the name, and the address on the old license are compared with those on the application form by the receptionist, that those on the application form being the target move to the examiner because the applicant brings them, and that the photo on the application form is then compared with the figure of the applicant by the examiner.

Each action can be assigned with a reliability. The reliability corresponding to each of the actions "move", "transfer", and "bring" indicates how accurately the attribute is delivered. The reliability corresponding to each of the actions "photograph" and "transcript" indicates how accurately the attribute is copied. The reliability corresponding to the action "compare" indicates how accurately the attribute is compared.

FIG. 2 is an example of the action matrix including the reliabilities of the actions in the entire license renewal procedure. Each reliability is represented by an actual number equal to or more than zero and equal to or less than one. A larger number indicates a higher reliability. To simplify the explanation, the example shown in FIG. 2 indicates only the attributes of the photo and the figure and the actions related to the attributes.

A photographer herein indicates a person in the applied party in charge of taking a picture for the new license. A creator herein indicates a person in the applied party in charge of creating the new license. An issuer herein indicates a person in the applied party in charge of issuing the new license.

In the example, because the action taken by the applied party is assumed to be reliable, the reliabilities of the actions "compare", "photograph", "transfer", and "transcript" are all one. On the contrary, because it is assumed that the action taken by the applicant can be dishonest, the reliability of the "move" is zero, the reliability of the "bring" of the photo on the application form from the receptionist to the examiner is 0.8, and the reliability of the "bring" of the photo on the application form from the examiner to the photographer is 0.9. The reliabilities of the "bring" are different depending on, for example, the distance and time required for the applicant to deliver the attribute.

FIG. 3 is a block diagram based on the action matrix shown in FIG. 2. The attributes connected to any one of the actions are extracted from the action matrix, and the extracted attributes are connected to one another with an arrow indicative of the action.

In this manner, the association among the attributes in the action matrix can be represented by the diagram that connects nodes indicative of the object and the attribute thereof at a certain step with a path indicative of the action. Each of the paths includes a reliability assigned to the corresponding action.

FIG. 4 is a simple model of the block diagram shown in FIG. 3. The model includes nodes 31 to 37.

The node 31 has paths to the nodes 32 and 35, and the node 32 has a path to the node 33. The node 33 has paths to the nodes 34 and 36, and the node 34 has a path to the node 37. The node 35 has a path to the node 36, and the node 36 has a path to the node 37.

The node 31 is a starting point of the application procedure. The reliability evaluation method according to the present embodiment is explained as a method of evaluating the reliability of the application procedure at the node 37.

The reliability at the starting point is delivered to a node of which the reliability is evaluated (hereinafter, "verification point") via the paths that connect the nodes, and the delivered reliability can be regarded as the reliability of the application procedure at the verification point (hereinafter, "verification-point reliability").

The reliability at the starting point decreases when passing through a path with a low reliability by the amount of the difference in reliability. In other words, the verification-point reliability can be high if the reliability of each path between the starting point and the verification point is high, and it is low if the reliability of each path between the starting point and the verification point is low.

While the example shown in FIG. 4 indicates three routes from the starting point to the verification point, the reliability of the route with the highest reliability can be regarded as the verification-point reliability because the reliability of other routes can be ignored in general if the reliability is known from one of the routes.

In summary, a verification-point reliability N can be obtained using the following equation:

$$N = \max(R_1, R_2, R_3, \ldots, R_n) \quad (1)$$

The Ri indicates the reliability of the application procedure via an i-th route among n routes, and the max( ) indicates a function to calculate a maximum value. The Ri can be obtained using the following equation:

$$R_i = Y \cdot X_{i1} \cdot X_{i2} \cdot X_{i3} \cdot \ldots \cdot X_{im} \quad (2)$$

The Y indicates the reliability at the starting point, and the Xij indicates the reliability of a j-th path in the i-th route. An equation to calculate the verification-point reliability N can be defined also by one of the following equations:

$$N = \min(R_1, R_2, R_3, \ldots, R_n) \quad (3)$$

$$N = \mathrm{ave}(R_1, R_2, R_3, \ldots, R_n) \quad (4)$$

The min( ) indicates a function to calculate a minimum value, and the ave( ) indicates a function to calculate an average value. In a certain type of the application procedure, only one of the routes can be used. In such a case, the Equation 3 is suitable for most strictly evaluating the reliability assuming the worst case. The Equation 4 is suitable for slightly less strictly evaluating the reliability.

Moreover, a plurality of the verification points can be provided to evaluate a total reliability of the application procedure by combining the verification point reliabilities. A total reliability C resulting from combining the p verification point reliabilities can be obtained by, for example, using the following equation:

$$C = N_1 \cdot N_2 \cdot N_3 \cdot \ldots \cdot N_p \quad (5)$$

According to the Equation 5, a product of the verification point reliabilities is the total reliability, and the reliability is assumed to be guaranteed at all of the p verification points. Another equation can be used depending on the purpose. For example, when the reliability needs to be guaranteed at only one verification point, a sum of the verification point reliabilities is defined as the total reliability that is obtained by the following equation:

$$C = N_1 + N_2 + N_3 + \ldots + N_p \quad (6)$$

Furthermore, when importance varies depending on the verification point, a weight can be applied to each verification point as calculated by the following equation:

$$C = a_1 \cdot N_1 + a_2 \cdot N_2 + a_3 \cdot N_3 + \ldots + a_p \cdot N_p \quad (7)$$

Returning to the explanation of FIG. 3, results of the calculation of the verification point reliabilities at nodes 19 to 22 starting from a node 11 are shown in the following table:

TABLE 1

| VERIFICATION POINT | VERIFICATION POINT RELIABILITY |
|---|---|
| APPLICATION FORN@RECEPTIONIST.PHOTO | 1.00 |
| APPLICATION FORM@EXAMINER.PHOTO | 0.80 |
| APPLICATION FORM@PHOTOGRAPHER.PHOTO | 0.72 |
| NEW LICENSE@CREATOR.PHOTO | 0.72 |

The verification point reliabilities are calculated using the Equation 1 and the Equation 2 assuming the reliability at the starting point to be one. When the verification point reliabilities are assigned to the Equation 5, the total reliability is about 0.41.

Figure 5:
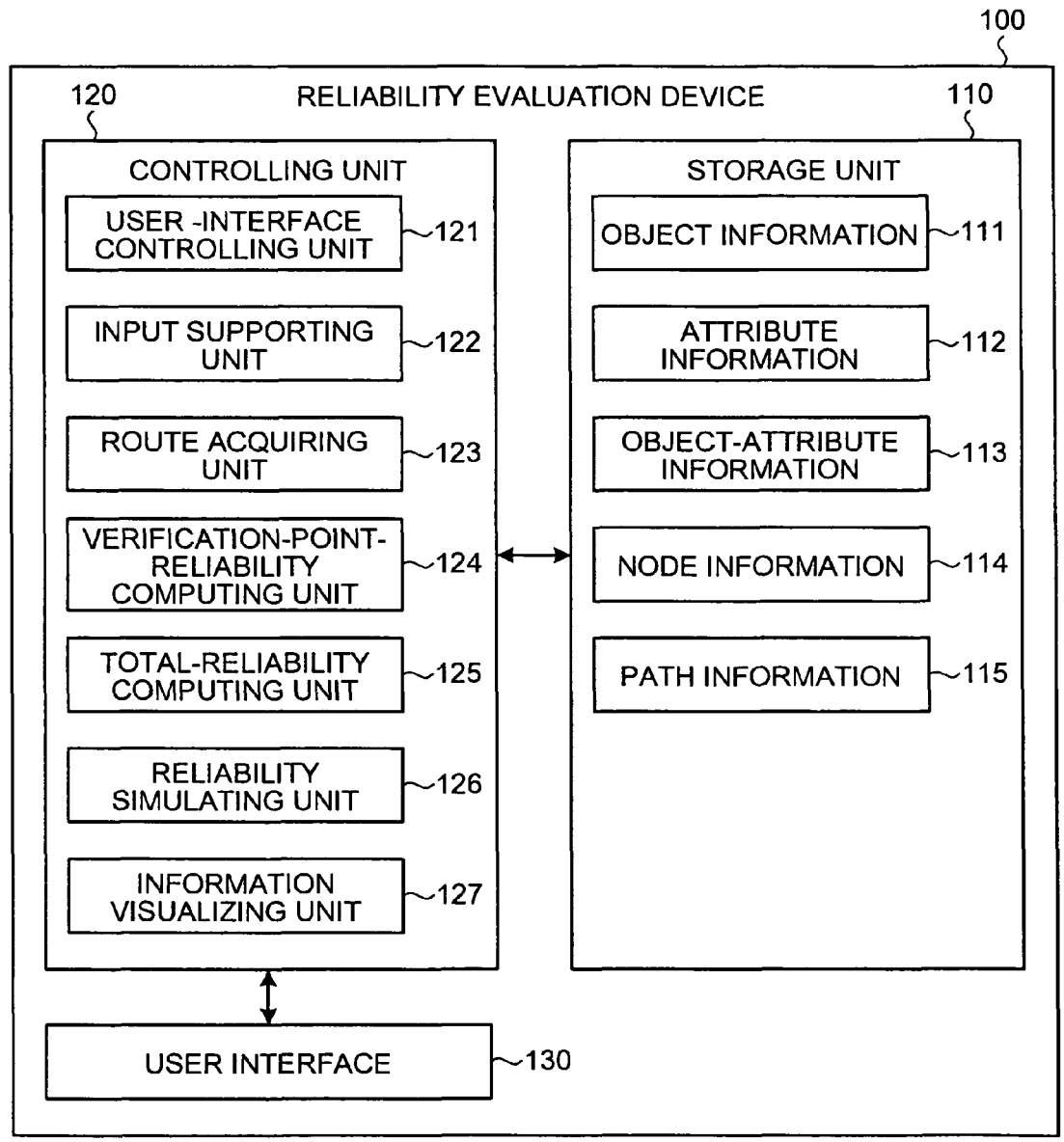
FIG. 5 is a function block diagram of a reliability evaluation device according to the embodiment.

FIG. 5 is a function block diagram of a reliability evaluation device 100 according to the embodiment. The reliability evaluation device 100 includes a storage unit 110, a controlling unit 120, and a user interface 130. The user interface 130 is used by a user to input information and displays information to the user. The user interface 130 includes a keyboard, a monitor, and the like.

The storage unit 110 stores therein various types of information such as object information 111, attribute information 112, object-attribute information 113, node information 114, and path information 115.

The object information 111 includes a list of objects used for verifications performed at the steps of the application procedure. FIG. 6 is an example of a data configuration of the object information 111. The object information 111 includes items of an object identity (ID) and an object name. The object ID is an identification number that identifies each object, and the object name is a name of the object.

In the first line item, the object ID is "OB001", and the object name is "old license". This indicates that there is an object named "old license" and that the object is identified by the object ID "OB001".

The attribute information 112 includes a list of attributes that can be included in the objects. FIG. 7 is an example of a data configuration of the attribute information 112. The attribute information 112 includes items of an attribute ID, an attribute name, and an associated attribute. The attribute ID is an identification number that identifies each attribute, and the attribute name is a name of the attribute.

The associated attribute is an attribute ID of another attribute that can be compared with the attribute. Generally, the same type of attributes is compared with each other; however, sometimes different attributes are compared like a photo and a figure. When there is a different attribute to be compared with, the attribute ID is registered as the associated attribute, and when there is not a different attribute to be compared with, the cell of the associated attribute is blank.

In the first line item, the attribute ID is "AT001", the attribute name is "photo", and the associated attribute is "AT004". This indicates that there is an attribute named "photo", that it is identified by the attribute ID "AT001", and that it can be compared with another attribute identified by the attribute ID "AT004" as well as the same attribute.

The object-attribute information 113 includes the association between the objects and the attributes. FIG. 8 is an example of a data configuration of the object-attribute information 113. The object-attribute information 113 includes items of the object ID, the attribute ID, and remarks.

The object ID corresponds to that in the object information 111, and the attribute ID corresponds to that in the attribute information 112. The combination of the object ID and the attribute ID in the same line item indicates that the object identified by the object ID includes the attribute identified by the attribute ID. The remark indicates a free comment.

In the first line item, the object ID is "OB001", and the attribute ID is "AT001". This indicates that the object named "old license" identified by the object ID "OB001" includes the attribute named "photo" identified by the attribute ID "AT001".

A single object can include a plurality of the attributes, and the object-attribute information 113 includes the same number of line items as that of the attributes included in the object.

The node information 114 manages the objects with respect to each step of the application procedure, and corresponds to the information in the top row and the leftmost column of the action matrix. FIG. 9 is an example, of a data configuration of the node information 114. The node information 114 includes items of a node name, the object ID, and an occurrence order.

The node name is used to distinguish objects used at a predetermined step of the application procedure, and described as <object name>@<person in the applied party in charge of the predetermined step>.

The object ID corresponds to that in the object information 111. The occurrence order is the order of occurrence of the nodes that uses the object in the application procedure, and the node with a smaller value occurs earlier.

In the first line item, the node name is "old license@receptionest", the object ID is "OB001", and the occurrence order is "1". This indicates that the object named "old license" identified by the object ID "OB001" is distinguished from the same object used at another step by the node name "old license@receptionest", and that the object appears at the earliest stage of the application procedure.

The path information 115 indicates the association among the nodes in the node information 114, and corresponds to the information in the cells of the action matrix. FIG. 10 is an example of a data configuration of the path information 115.

The path information 115 includes the items of the node name and the attribute ID of the origin node (hereinafter, "origin"), the node name and the attribute ID of the destination node (hereinafter, "destination"), the action, a path reliability, a verification-point flag, and the verification-point reliability.

The node name and the attribute ID of the origin indicate the node at which information originates and the attribute of the node. The node name and the attribute ID of the destination indicate the node to which the information is delivered and the attribute of the node.

The action indicates the name of the action that associates two nodes, and the path reliability indicates the reliability of the action. The verification-point flag indicates one when the destination is the verification point, and otherwise indicates zero. The verification-point reliability indicates the computed reliability of the verification point when the destination is the verification point.

In the first line item shown in FIG. 10, the node name and the attribute ID of the origin are blank. Such a line item that includes the blank node name and the blank attribute ID in the column of the origin indicates that the destination is the starting point, and the path reliability in the line item indicates the reliability at the starting point. The first line item indicates that the node named "old license@receptionist" is the starting point and that the reliability at the starting point is one.

The controlling unit 120 controls the entire reliability evaluation device 100, and includes a user-interface controlling unit 121, an input supporting unit 122, a route acquiring unit 123, a verification-point-reliability computing unit 124, a total-reliability computing unit 125, a reliability simulating unit 126, and an information visualizing unit 127.

The user-interface controlling unit 121 controls the user interface 130 to input and output information. FIG. 11 is an example of input/output screen displayed on the user interface 130 so that the user-interface controlling unit 121 registers, corrects, and deletes the information included in the path information 115.

The input/output screen takes a form of the action matrix. The action matrix is user-friendly because it enables the user to instinctively input the information.

To display the input/output screen, the user-interface controlling unit 121 arranges the data in the path information 115 in the top row and the leftmost column in the occurrence order, acquires the attributes corresponding to the objects in each node by referring to the object-attribute information 113 and the attribute information 112, and adds the acquired attributes to the top row and the leftmost column.

The user-interface controlling unit 121 displays the data in the path information 115 in a corresponding cell on the action matrix. For example, because the first line item in FIG. 10 indicates the starting point, the user-interface controlling unit 121 displays one as the path reliability in a cell 7 corresponding to the "old license@receptionist" in FIG. 11.

Because a second line item in FIG. 10 indicates the photo of "old license@receptionist" as the origin and the photo of "application form@receptionist" as the destination, the user-interface controlling unit 121 displays the action name "compare" in the upper part and the path reliability one in the lower part of a cell 2 in an input area 5.

Because the value of the verification-point flag in the second line item is one, the user-interface controlling unit 121 displays one in the upper part of a verification-point reliability cell 6 at the left end of the row that includes the cell 2. This indicates that the corresponding node is the verification point. The screen also displays the result of the evaluation of the reliability, and the computed verification-point reliability is displayed in the lower part of the verification-point reliability cell 6.

After displaying all data in the path information 115 in the action matrix, the user-interface controlling unit 121 accepts the addition of the action, the correction of the action, the deletion of the action, the setup of the path reliability, the correction of the path reliability, the setup of the starting point, the setup of the verification point, and the like from the user. The user-interface controlling unit 121 then reflects the result on the path information 115.

The input supporting unit 122 supports the input of information to the input/output screen. For example, the action "compare" can be performed only between the same attributes or the attributes associated by the attribute information 112. The action "compare" cannot be set for the attribute that has not yet appeared in the application procedure.

The input supporting unit 122 determines whether the action "compare" can be set based on the associated attribute in the attribute information 112 and the occurrence order in the node information 114. When the user tries to add the action "compare" to a certain attribute, the input supporting unit 122 presents candidates of the attribute that can be compared with the certain attribute. Moreover, the input supporting unit 122 issues a warning when the user terminates the editing operation with the starting point unconnected with any of the verification points.

The route acquiring unit 123 acquires a route from the starting point to the verification point required for evaluating the reliability of the application procedure based on the path information 115. The verification-point-reliability computing unit 124 computes the verification point reliabilities using the acquired route. The Equation 1, the Equation 2, and the like are used to compute the verification point reliabilities.

The total-reliability computing unit 125 computes the total reliability based on the verification point reliabilities computed by the verification-point-reliability computing unit 124. The Equation 5 and the like are used to compute the total reliability.

The reliability simulating unit 126 verifies how the reliability of the application procedure changes when a certain condition is changed. The reliability simulating unit 126 creates a copy of the path information 115, instructs the route acquiring unit 123 and the verification-point-reliability computing unit 124 to compute the verification reliability based on the copy that is modified using the screen shown in FIG. 11, and displays the result along with the original verification-point reliability.

The user can use the function to verify how much the reliability of the application procedure improves when a comparison between certain attributes is added. The verification result when the comparison and the path reliability one is added to a cell 3 in FIG. 11 is shown in the following table.

TABLE 2

| VERIFICATION POINT | VERIFICATION POINT RELIABILITY | VERIFICATION POINT RELIABILITY WHEN COMPARISON IS ADDED |
|---|---|---|
| APPLICATION FORM@RECEPTIONIST.PHOTO | 1.00 | 1.00 |
| APPLICATION FORM@EXAMINER.PHOTO | 0.80 | 0.80 |
| APPLICATION FORM@PHOTOGRAPHER.PHOTO | 0.72 | 0.72 |
| NEW LICENSE@CREATOR.PHOTO | 0.72 | 0.72 |

The result indicates that the reliability cannot be improved by adding the comparison to the cell 3.

Moreover, the function enables the user to verify how much the reliability of the application procedure decreases when a comparison between certain attributes is omitted. The verification results when a comparison A is omitted from a cell 1 and when a comparison B is omitted from the cell 2 in FIG. 11 are shown in the following table.

TABLE 3

| VERIFICATION POINT | VERIFICATION POINT RELIABILITY | VERIFICATION POINT RELIABILITY WHEN COMPARISON A IS OMITTED | VERIFICATION POINT RELIABILITY WHEN COMPARISON B IS OMITTED |
|---|---|---|---|
| APPLICATION FORM@RECEPTIONIST.PHOTO | 1.00 | 0.00 | 1.00 |
| APPLICATION FORM@EXAMINER.PHOTO | 0.80 | 0.80 | 0.00 |
| APPLICATION FORM@PHOTOGRAPHER.PHOTO | 0.72 | 0.72 | 0.00 |
| NEW LICENSE@CREATOR.PHOTO | 0.72 | 0.72 | 0.00 |

The result indicates that the reliability can be compensated by later comparisons when the comparison A is omitted, and that the reliability greatly decreases through the entire application procedure when the comparison B is omitted.

Figure 12:
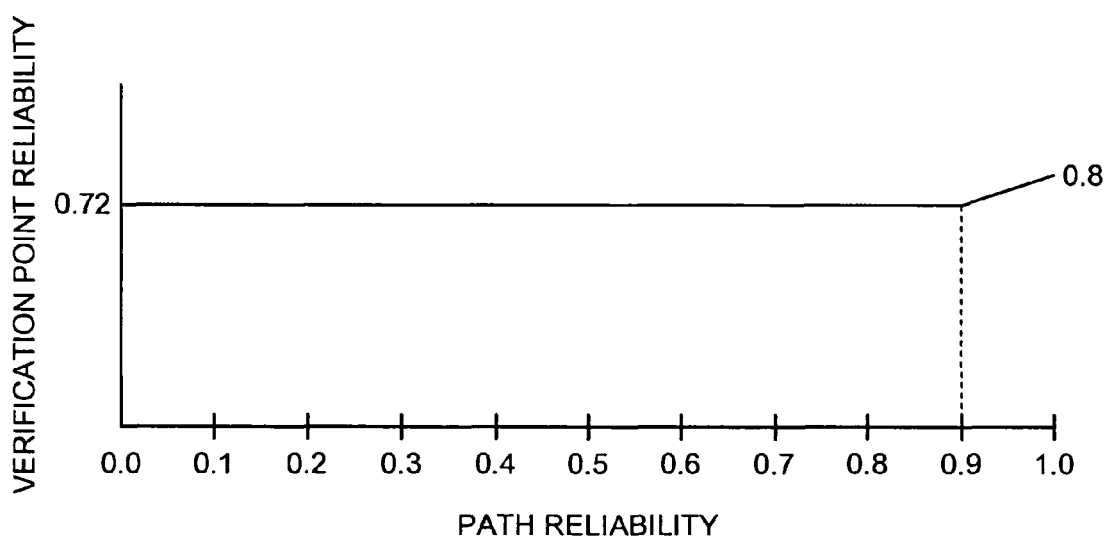
FIG. 12 is an example of change of verification-point reliability when path reliability varies.

Moreover, the reliability simulating unit 126 can simulate how the reliability of the application procedure changes when the path reliability of an action varies in a predetermined range and plot a graph of the result. FIG. 12 is a graph of the verification-point reliability at the verification point "new license@issuer.photo" when the reliability of the action "move" in a cell 4 varies by 0.1 from zero to one.

It is known from the graph that the reliability cannot improve by adding the comparison to the cell 3. It is also known that the verification-point reliability is not affected by the improvement of the reliability of the action "move" in the cell 4 as long as the reliability is equal to or less than 0.9.

Furthermore, the reliability simulating unit 126 can compute an amount of virtual change when the path reliability at each action varies in a narrow range ($\delta X$) and an amount of the accompanying change of the reliability at the verification point ($\delta C$), perform a sensitivity analysis by calculating a quotient of the amounts ($\delta C/\delta X$), thereby find actions highly effective to improve the verification-point reliability, and present the actions to the user.

The user can effectively design and improve the application procedure by using the functions of the reliability simulating unit 126.

The information visualizing unit 127 divides the action matrix and displays the divided action matrix in two or three dimensions. As described above, in the action matrix, the attribute in the leftmost column associated with the attribute in the top row through the action appears in the next step as the attribute with the same name in the top row. In a large action matrix, it is difficult to visually recognize both of the attributes with the same name in the leftmost column and the top row.

Figure 13:
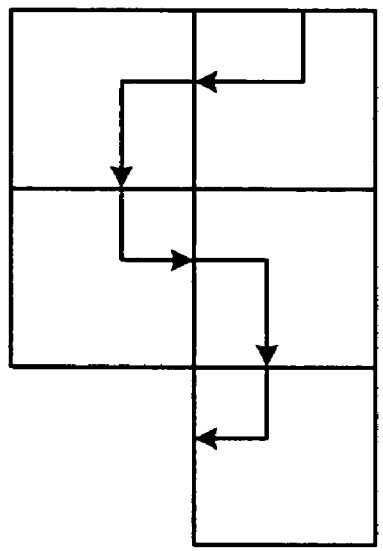
FIG. 13 is an example of a plurality of two-dimensional matrices arranged planarly.
Figure 14:
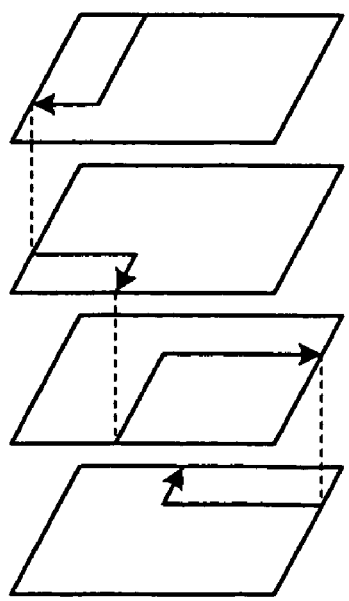
FIG. 14 is an example of the two-dimensional matrices arranged spatially.

The information visualizing unit 127 improves the visibility of the associated attributes in the leftmost column and the top row by dividing the action matrix and displaying the divided action matrix in two or three dimensions as shown in FIGS. 13 and 14.

The process performed by the reliability evaluation device 100 shown in FIG. 5 is explained below. Herein, the process of computing the verification-point reliability by the route acquiring unit 123 and the verification-point-reliability computing unit 124 is explained.

Figure 15:
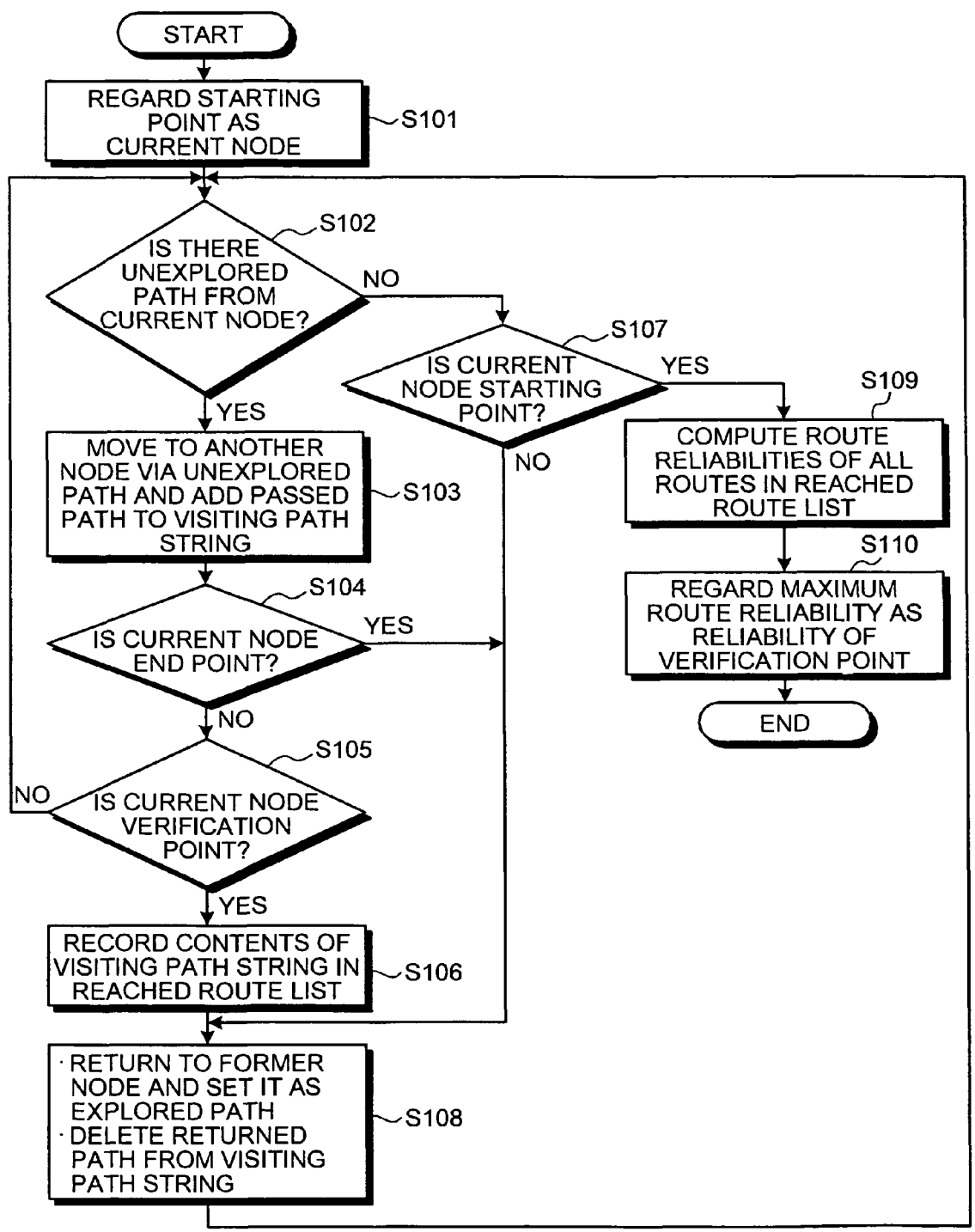
FIG. 15 is a flowchart of a process performed by the reliability evaluation device.

As shown in FIG. 15, the route acquiring unit 123 reads all of the path information 115, and regards the starting point as a current node (step S101). If the information read by the route acquiring unit 123 includes any unexplored path from the current node (YES at step S102), the process moves to another node via any one of the unexplored paths and adds the path just passed to a visiting path string (step S103).

If the current node after the move is an end point and not a verification point (YES at step S104), the process control returns to the former node, sets the returned path as an explored path, deletes the returned path from the visiting path string (step S108), and resumes from the step S102.

If the current node after the move is not the end point (NO at step S104) and not the verification point (NO at step S105), the process resumes from the step S102 without any other operation. If the current node is not the end point (NO at step S104) but the verification point (YES at step S105), contents of the visiting path string is recorded in a reached route list (step S106), the step S108 is performed, and the process resumes from the step S102.

If the information read by the route acquiring unit 123 does not include an unexplored path from the current node (NO at step S102) and the current node is not the starting point (NO at step S107), the step S108 is performed, and the process resumes from the step S102. If the current node is the starting point (YES at step S107), the verification-point-reliability computing unit 124 computes the reliability of each route recorded in the reached route list (step S109) and regards the maximum value of the computed result as the verification-point reliability (step S110).

Figure 16:
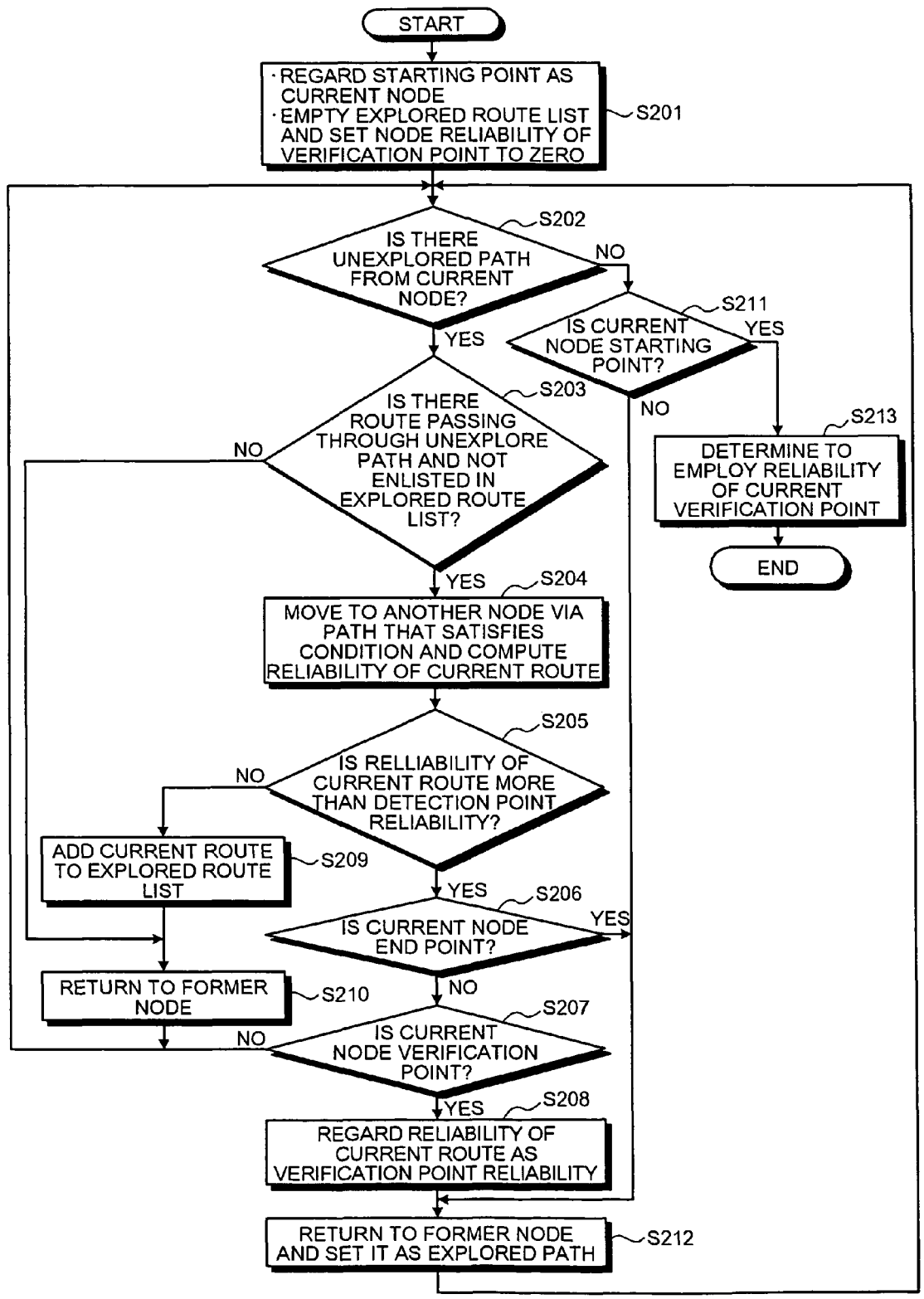
FIG. 16 is a flowchart of the process that eliminates unnecessary explorations.

When the maximum reliability among a plurality of the routes is used as the verification-point reliability, it is useless to continue exploring a route that has been proven to be less reliable than another route. FIG. 16 is a flowchart of the process without unnecessary explorations.

The route acquiring unit 123 reads all of the path information 115, regards the starting point as a current node, empties an explored route list, and assigns zero to a variable of the verification-point reliability (step S201).

If the read information includes any unexplored path from the current node (YES at step S202), the route acquiring unit 123 checks whether there is a route that passes through any unexplored path and that is not enlisted in the explored route list. If there is no such route (NO at step S203), the process control returns to the former node (step S210) and resumes from the step S202.

If there is a route that satisfies the conditions at step S203 (YES at step S203), the process moves to another node via any one of the paths and the verification-point-reliability computing unit 124 computes the reliability of the route from the starting point to the current node (step S204). If the computed reliability is less than the variable of the verification-point reliability (NO at step S205), the current route is included in the explored routes (step S209), the process control returns to the former node (step S210), and the process resumes from the step S202.

If the reliability computed at the step S204 is equal to or more than the variable of the Verification-point reliability (YES at step S205) and the current node after the move is the end point and not a verification point (YES at step S206), the process control returns to the former node, sets the returned path as an explored path (step S212), and resumes from the step S202.

If the current node after the move is not the end point (NO at step S206) and not the verification point (NO at step S207), the process resumes from the step S202 without any other operation. If the current node is not the end point (NO at step S206) but the verification point (YES at step S207), the reliability computed at the step S204 is set as the variable of the verification-point reliability (step S208), the process control returns to a former node, sets the returned path as an explored path (step S212), and resumes from the step S202.

If the read information does not include any unexplored path from the current node at the step S202 (NO at step S202) and the current node is not the starting point (NO at step S211), the process control returns to the former node, sets the returned path as an explored path (step S212), and resumes from the step S202. If the read information does not include any unexplored path from the current node at the step S202 (NO at step S202) and the current node is the starting point (YES at step S211), the value assigned to the variable of the verification-point reliability is determined to be the verification-point reliability (step S213).

The function of the reliability evaluation device 100 described above can be realized by executing a reliability evaluation program on a computer. An example of the computer that executes the reliability evaluation program is explained below.

Figure 17:
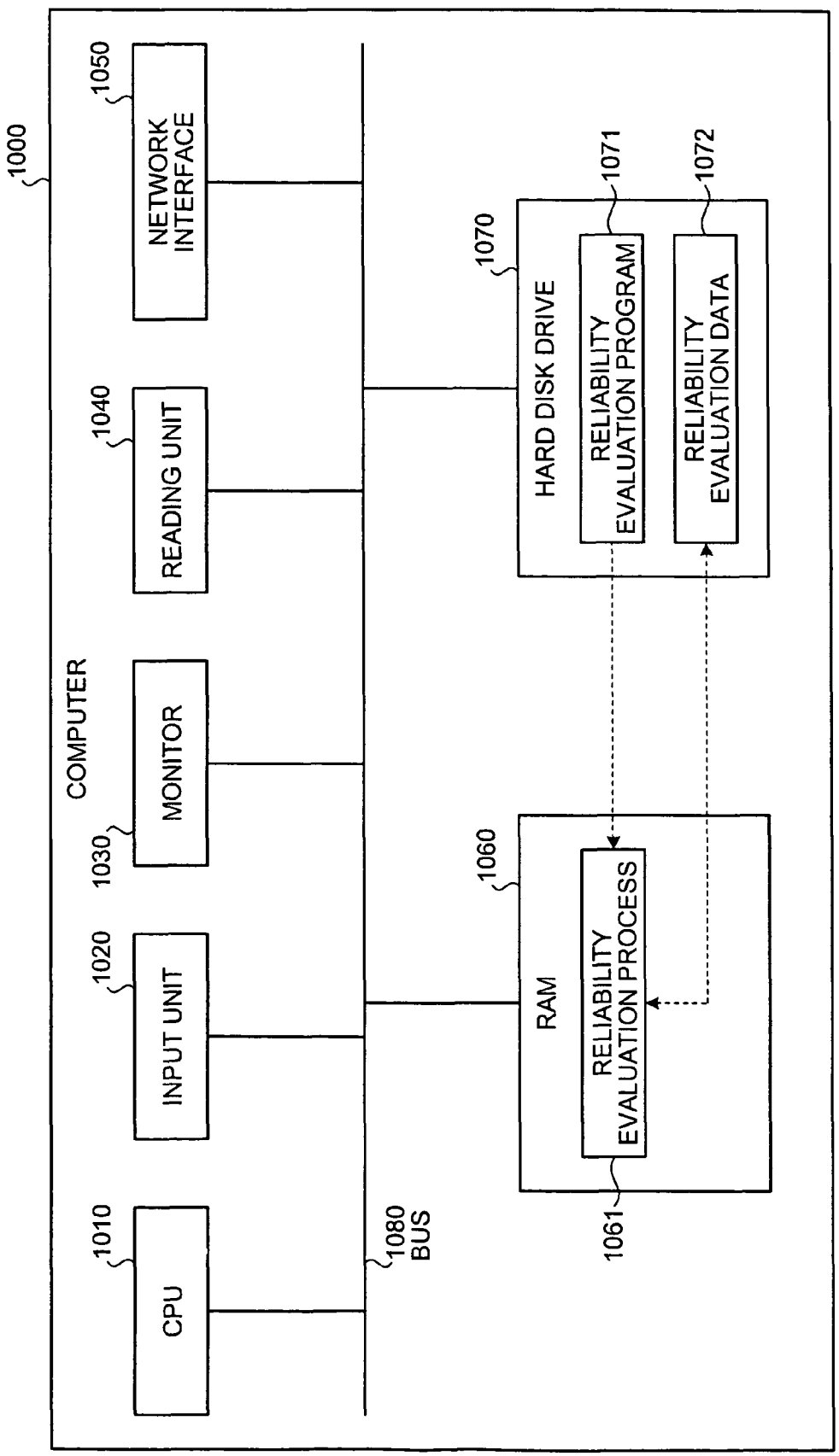
FIG. 17 is a function block diagram of a computer that executes a reliability evaluation program.

FIG. 17 is a function block diagram of a computer 1000 that executes a reliability evaluation program 1071. The computer 1000 includes a central processing unit (CPU) 1010 that executes various computations, an input unit 1020 that accepts data input by the user, a monitor 1030 that displays information, a reading unit 1040 that reads programs and the like from a recording medium recorded with various programs, a network interface 1050 that transfers data to and from another computer via a network, a random access memory (RAM) 1060 that temporarily stores therein the information, a hard disk drive 1070, and a bus 1080 that connects the units.

The hard disk drive 1070 stores therein the reliability evaluation program 1071 with the function equivalent to the controlling unit 120 and a reliability evaluation data 1072 equivalent to various data stored in the storage unit 110. The reliability evaluation data 1072 can be separated and stored in other computers connected via the network.

The CPU 1010 reads the reliability evaluation program 1071 from the hard disk drive 1070 and develops it in the RAM 1060, whereby the reliability evaluation program 1071 functions as a reliability evaluation process 1061. The reliability evaluation process 1061 develops information read from the reliability evaluation data 1072 and the like in an area of the RAM 1060 assigned to the reliability evaluation process 1061 as needed, and processes various data based on the developed data and the like.

The reliability evaluation program 1071 does not necessarily need to be stored in the hard disk drive 1070; it can be stored in a recording medium such as a compact disk read only memory (CD-ROM) and executed by the computer 1000 reading it. The reliability evaluation program 1071 can be otherwise stored in another computer or a server connected to the computer 1000 via a public line, the Internet, a local area network, a wide area network, or the like, and executed by the computer 1000 reading it.

As described above, according to the present embodiment, a flow of the information transferred between the steps of the application procedure is defined as a path, and the reliability of the application procedure is computed based on the path reliability assigned to each path. As a result, the reliability of the application procedure can be quantitatively evaluated and the quantitative evaluation improves efficiency of the design works and the improvement works of the process in the application procedure.

While the embodiment was explained assuming that the reliability at the starting point be one, the reliability at the starting point does not necessarily need to be one. For example, comparing a license that has been used for the identity verification in many occasions through many renewals and a license that is being renewed for the first time, the former is assumed to be more reliable. In this manner, the reliability of the starting point can vary depending on the validity period, the use count, and the like of the object being the starting point.

According to an aspect of the present invention, a flow of the information transferred between the steps of the application procedure is defined as a path, and the reliability of the application procedure is computed based on the path reliability assigned to each path. This results in an advantage that the reliability of the application procedure can be quantitatively evaluated.

According to another aspect of the present invention, because various analyses and simulations can be performed by computing the reliability of the application procedure, the reliability can be computed and compared based on a variety of the application procedures, and efficiency of the design works and the improvement works of the process in the application procedure can be improved.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A non-transitory computer-readable recording medium that stores therein a computer program that causes a computer to evaluate reliability of an application process, the program causing a computer to execute:
   referring to a storage unit which stores a first data that includes an association between a starting point node and a reliability of the starting point node, and a second data,
      the starting point node being a starting point of a plurality of nodes that include an object used for verification of factual information about an applicant at each step of the application procedure, information of a person in an applied party relating to the object, and an attribute of the object, and
      the second data including association between an origin node at which information originates, a destination node to which the information is delivered, an action which indicates a process which is executed by the applicant or the person in the applied party in an information flow from the origin node to the destination node, and a path reliability indicating a reliability of the action,
   acquiring, based on the first and second data, the reliability of the starting Point node and the path reliability corresponding to the action which is in a route where information flows from the origin node to a verification point node that is the destination node whose reliability in the application procedure is to be evaluated; and
   computing the reliability of the application procedure with respect to the route by multiplying the reliability of the starting point node and the path reliability corresponding to the action which is in the route.

2. The non-transitory computer-readable recording medium according to claim 1, wherein the program causes the computer to further execute computing total reliability of the application procedure by multiplying or adding the reliability of the application procedure with respect to a plurality of routes computed at the computing the reliability of the application procedure.

3. The non-transitory computer-readable recording medium according to claim 1, wherein the program causes the computer to further execute displaying results of the computing before and after modifying the data in parallel with each other.

4. The non-transitory computer-readable recording medium according to claim 3, wherein the displaying includes continually changing a part of the data and plotting a graph of the results of the computing that accompany the fluctuating.

5. The non-transitory computer-readable recording medium according to claim 1, wherein the program causes the computer to further execute:

computing, with respect to each route, a proportion of a predetermined fluctuating amount of the path reliability to a fluctuating amount of the reliability on the route of the application procedure computed accompanying fluctuating of the path reliability; and extracting a route that has the proportion that is more than a threshold.

6. A reliability evaluation device comprising:

a controlling unit that refers to a storage unit which stores a first data that includes an association between a starting point node and a reliability of the starting point node, and a second data, the starting point node being a starting point of a plurality of nodes that include an object used for verification of factual information about an applicant at each step of the application procedure, information of a person in an applied party relating to the object, and an attribute of the object, and the second data including association between an origin node at which information originates, a destination node to which the information is delivered, an action which indicates a process which is executed by the applicant or the person in the applied party in an information flow from the origin node to the destination node, and a path reliability indicating a reliability of the action, that acquires, based on the first and second data, the reliability of the starting point node and the path reliability corresponding to the action which is in a route where information flows from the origin node to a verification point node that is the destination node whose reliability in the application procedure is to be evaluated; and that computes the reliability of the application procedure with respect to the route by multiplying the reliability of the starting point node and the path reliability corresponding to the action which is in the route.

7. The reliability evaluation device according to claim 6, further comprising a calculating unit that calculates total reliability of the application procedure by adding the reliability of the application procedure with respect to a plurality of the routes computed by the reliability computing unit.

8. The reliability evaluation device according to claim 6, further comprising a displaying unit that displays results obtained by the reliability computing unit before and after modifying the data in parallel with each other.

9. A method of evaluating reliability of an application process, the method comprising:

referring, using a processor, to a storage unit which stores a first data that includes an association between a starting point node and a reliability of the starting point node, and a second data, the starting point node being a starting point of a plurality of nodes that include an object used for verification of factual information about an applicant at each step of the application procedure, information of a person in an applied party relating to the object, and an attribute of the object, and the second data including association between an origin node at which information originates, a destination node to which the information is delivered, an action which indicates a process which is executed by the applicant or the person in the applied party in an information flow from the origin node to the destination node, and a path reliability indicating a reliability of the action, acquiring, based on the first and second data, the reliability of the starting point node and the path reliability corresponding to the action which is in a route where information flows from the origin node to a verification point node that is the destination node whose reliability in the application procedure is to be evaluated; and computing, using a processor, the reliability of the application procedure with respect to the route by multiplying the reliability of the starting point node and the path reliability corresponding to the action which is in the route.

* * * * *

UNITED STATES PATENT AND TRADEMARK OFFICE
CERTIFICATE OF CORRECTION

PATENT NO. : 8,407,150 B2
APPLICATION NO. : 11/653250
DATED : March 26, 2013
INVENTOR(S) : Hironobu Kitajima et al.

It is certified that error appears in the above-identified patent and that said Letters Patent is hereby corrected as shown below:

In the Claims

Column 14, Line 39, In Claim 1, delete "Point" and insert -- point --, therefor.
Column 16, Line 1, In Claim 7, after "procedure by" insert -- multiplying or --.

Signed and Sealed this
Twenty-fifth Day of June, 2013

Teresa Stanek Rea
*Acting Director of the United States Patent and Trademark Office*